United States Patent [19]

Tsuruta

[11] Patent Number: 5,377,790
[45] Date of Patent: Jan. 3, 1995

[54] BRAKE PAD CLIP WITH HOLDING, SIDE AND DAMPER PORTIONS

[75] Inventor: Matsuhisa Tsuruta, Toyota, Japan
[73] Assignee: Aisin Seiki Kabushiki Kaisha, Kariya, Japan
[21] Appl. No.: 29,604
[22] Filed: Mar. 11, 1993
[30] Foreign Application Priority Data
 Mar. 12, 1992 [JP] Japan .................. 4-053807
[51] Int. Cl.6 .......................... F16D 65/40
[52] U.S. Cl. ................ 188/73.38; 188/205 A; 188/250 E
[58] Field of Search .......... 188/73.1, 73.35–73.39, 188/205 A, 250 E, 72.3

[56] References Cited

U.S. PATENT DOCUMENTS

| | | | |
|---|---|---|---|
| 4,371,060 | 2/1983 | Iwata | 188/73.38 |
| 4,512,446 | 4/1985 | Chuwman et al. | 188/73.38 |
| 5,109,959 | 5/1992 | Kondo et al. | 188/73.39 X |
| 5,125,482 | 6/1992 | Negishi | 188/73.38 |

FOREIGN PATENT DOCUMENTS 60-21559 6/1985 Japan .

Primary Examiner—Robert J. Oberleitner
Assistant Examiner—Josie A. Ballato
Attorney, Agent, or Firm—Oblon, Spivak, McClelland, Maier, & Neustadt

[57] ABSTRACT

A disc brake assembly includes a disc rotor, a pair of brake pads, a mounting member supporting at least one of the brake pads so as to be able to slide in the parallel direction with respect to a rotational shaft of the disc rotor, a caliper member slidably supported on the mounting member so as to be movable in an axial direction of the disc rotor and pressing each of the brake pads against faces of the disc rotor, respectively and at least one first pad clip interposed between the mounting member which is positioned at the entry side in the rotational direction of the disc rotor in the forward movement of the vehicle and the brake pad which is slidably supported on the mounting. The first pad clip is provided with a holding portion unitarily formed on the first pad clip and urging the brake pad toward the diametrical direction or the disc rotor a side spring portion unitarily formed on the first pad clip and urging the brake pad toward the tangential direction in the rotational direction due to the forward movement the vehicle. The first pad clip is further provided with a damper portion unitarily formed on the first pad clip and having an arm portion which extends between the first pad clip and the brake pad toward the axial direction of the disc rotor and contacted with the first pad clip at its top end.

5 Claims, 4 Drawing Sheets

BRAKE PAD CLIP WITH HOLDING, SIDE AND DAMPER PORTIONS

BACKGROUND OF THE INVENTION

1. Field of the Invention

The present invention relates to a disc brake assembly for wheeled vehicles, and more particularly to a disc brake assembly including a side spring which is integrally formed on a pad clip engaged with a mounting member in order to slidably support the brake pad on the mounting member and which urges a brake pad toward the tangential direction in the rotational direction of a disc rotor.

2. Description of the Prior Art

As shown in FIG. 7, a conventional disc brake assembly of this kind includes a disc rotor (not shown) rotated together with a wheel in a body, a pair of brake pads 100 disposed to both sides of the disc rotor, a mounting member 101 fixed to a stationary member of a vehicle and supporting each of the brake pads 100 so as to be able to slide in the parallel direction with respect to a rotational shaft of the disc rotor, a caliper member 102 slidably supported on the mounting member 101 so as to be movable in an axial direction of the disc rotor and pressing each of the brake pads 100 against races or the disc rotor, respectively and pad clips 103 engaged with the mounting member 101 so as to be interposed between the mounting member 101 and each of both circumferential ends of the brake pads 100, respectively.

The mounting member 101 is provided with a pair of arm portions 101A which are disposed to both sides of the disc rotor and in which a pair of grooves 101a1, 101a2 extend toward the axial direction of the disc rotor. The brake pads 100 are provided with a pair of ear portions 100a, 100b which are outwardly projected at the outer side of both ends in the rotational direction of the disc rotor, respectively and which are fitted into the pair of grooves 101a1, 101a2 of the arm portions 101A of the mounting member 101 so as to be slidably supported on the arm portions 101A of the mounting member 101.

Each of the pad clips 103 is engaged with the mounting member 101 so as to cover each of grooves 101a1, 101a2 of the mounting member 101 and is provided with 8 holding portion 106 which urges the ear portion 100a (100b) of the brake pad 100 outwardly in the diametrical direction of the disc rotor and which is formed on the pad clip 103 in a body as shown in FIGS. 8a–8c. Thereby, each of the brake pads 100 is always urged by the holding portion 106 of the pad clip 103 so as to contact an upper surface of each of the ear portions 100a, 100b with an upper inner surface of each of the grooves 101a1, 101a2 and therefore each of the brake pads 100 is slidably supported on the mounting member 101 through the ear portions 100a, 100b and the grooves 101a1, 101a2 without a play in the diametrical direction of the disc rotor. The pad clips 103 engaged with the one side portions of the arm portions 101A which are positioned at the entry side in the rotational direction of the disc rotor due to the forward of the vehicle are provided with a side spring portion 105, respectively. The side spring portion 105 is formed on the pad clip 103 in a body and is provided with an elastic portion 105a which urges the ear portion 100a toward the tangential direction in the rotational direction of a disc rotor. Thereby, each of the brake pads 100 is always urged by the elastic portions 105a of the side spring portions 105 through the ear portion 100a so as to contact the ear portion 100b with a vertical surface of the pad clip 103 engaged with the other side portion of the arm portion 101A which is positioned at the exit side in the rotational direction of the disc rotor due to the forward of the vehicle. A shim 104 which is coated by rubber is Interposed between the pad clip 103 and vertical surface of the groove 101a1 formed on the one side portion of the arm portion 101A which is positioned at the entry side in the rotational direction of the disc rotor due to the forward of the vehicle, respectively.

According to the above prior disc brake assembly, the ear portion 100b of each of the brake pads 100 is always contacted with the vertical surface of the pad clip 103 engaged with the other side portion of the arm portion 101t by the elastic portion 105a of the side spring portion 105, respectively. Therefore, when the disc brake assembly operates in the forward movement of the vehicle, the brake pads 100 do not move toward the tangential direction in the rotational direction of the disc rotor and thereby it is prevented that the uncomfortable noise is generated by a collision between the other side portions of the arm portions 101A and the brake pads 100. On the other hand, in case of the operation of the disc brake assembly in the backward movement of the vehicle, the brake pads 100 move toward the tangential direction in the rotational direction of the disc rotor due to the backward movement of the vehicle and deform the elastic portion 105a of each of the side spring portions 105 elastically until the elastic portions 105a contact with the pad clips 103. When the elastic portions 105a contact with the pad clips 103, the shock is absorbed by the shims 104 and therefore it is prevented that the uncomfortable noise is generated by a collision between the one side portions of the arm portions 101A and the brake pads 100.

In the above conventional disc brake assembly, however, since the generation of the uncomfortable noise is prevented by the shims 104, the number of the parts of the disc brake assembly and the steps for assembling the disc brake assembly are increased, respectively. Therefore, the manufacturing cost of the disc brake assembly is increased and the assembling performance is deteriorated.

SUMMARY OF THE INVENTION

It is, therefore, an object of the present invention to provide an improved disc brake assembly which overcomes the above drawbacks.

It is another object of the present invention to provide an improved disc brake assembly which can prevent the generation of the uncomfortable noise without increasing of the manufacturing cost and the assembling steps of the disc brake assembly.

In order to achieve these objects, there is provided a disc brake assembly which includes a disc rotor rotated together with wheel, a mounting member fixed to a stationary member of a vehicle and having at least one arm portion in which a pair of grooves extending toward the axial direction of the disc rotor are provided therein, a pair of brake pads disposed to both sides of the disc rotor and having a pair of ear portions which are outwardly projected at the outer side of both ends of at least one of the brake pads in the rotational direction of the disc rotor and which are fitted into the grooves of the arm portion of the mounting member so as to be able to slide in the parallel direction with respect to a rotational shaft of the disc rotor, a caliper member slidably supported on the mounting member so as to be movable in an axial direction of the disc rotor and pressing each of the brake pads against faces of the disc rotor, respectively, and a first pad clip engaged with an one side portion of the arm portion of the mounting member which is positioned at the entry side in the rotational direction of the disc rotor due to the forward movement of the vehicle so as to cover one of the grooves and having a holding portion which is formed on the first pad clip in substantially a body and which normally urges the one brake pad in the diametrical direction of the disc rotor through an one ear portion formed on one end of the one brake pad, a side, spring portion which is unitarily formed on the first pad clip and which normally urges the one brake pad toward the tangential direction in the rotational direction of the disc rotor through the one ear portion so as to normally contact the other end of the one brake pad with the other side portion of the arm portion of the mounting member positioned at the exit side in the rotational direction of the disc rotor due to the forward movement of the vehicle and a damper portion which is unitarily formed on the first pad clip and which is provided with an arm portion extending between the first pad clip and an one end of the one ear portion of the one brake pad in the rotational direction of the disc rotor toward the axial direction of the disc rotor and contacted with the first pad clip at its top end.

BRIEF DESCRIPTION OF THE DRAWINGS

Additional objects and advantages of the present invention will become more apparent from the following detailed description of a preferred embodiment thereof when considered with reference to the attached drawings, in which.

Figure 3:
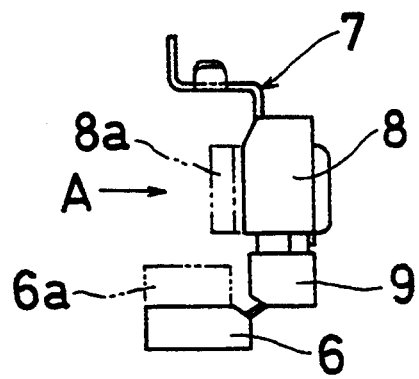
Figure 4:
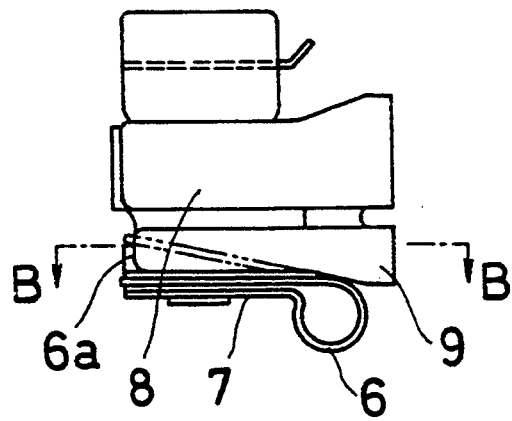
Figure 5:
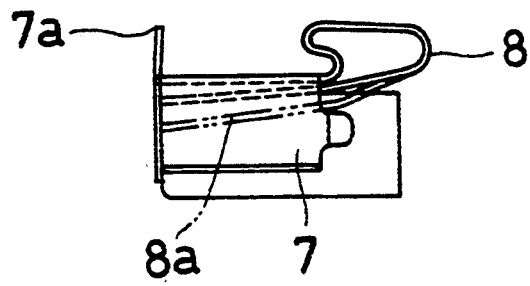
Figure 6:
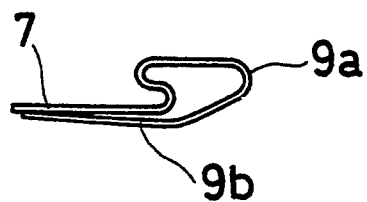
Figure 7:
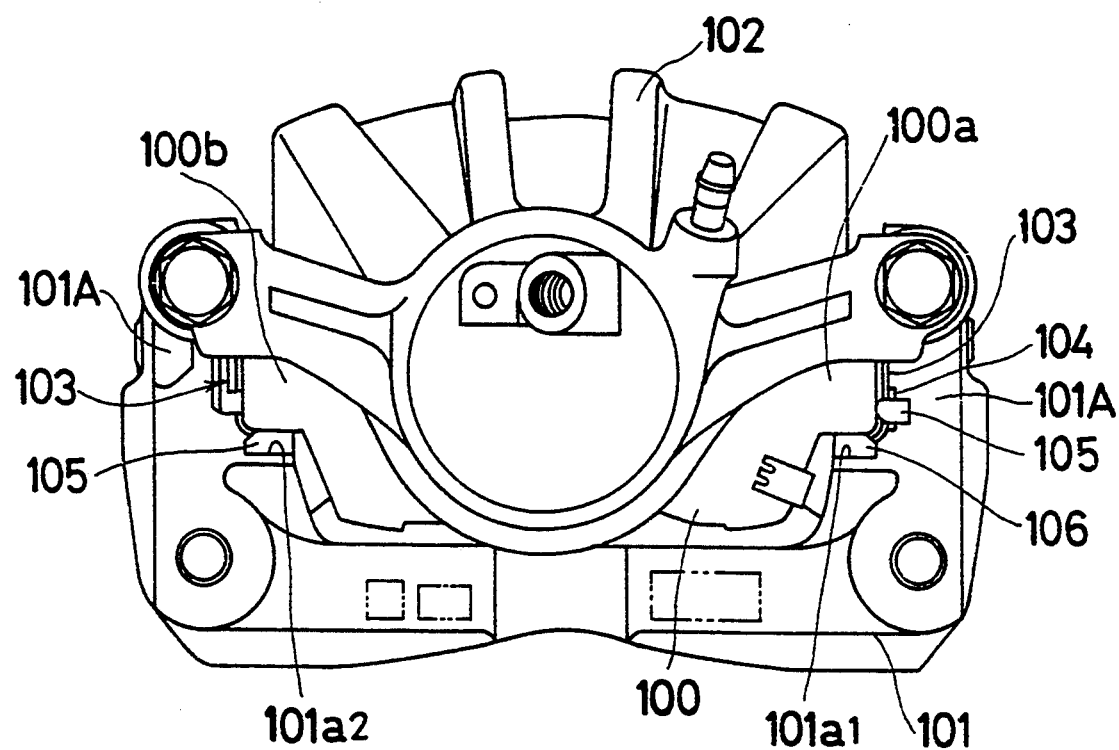

FIG .3 is an elevational view of a first pad clip of an embodiment of a disc brake assembly in accordance with the present invention;

FIG. 4 is a side view as seen from an arrow direction A in FIG. 3;

FIG. 5 is a plan view of FIG. 4;

FIG. 6 is a partially sectional view taken substantially along the line B—B of FIG. 4;

FIG. 7 is a rear elevational view of a prior disc brake assembly; and

Figure 8A:
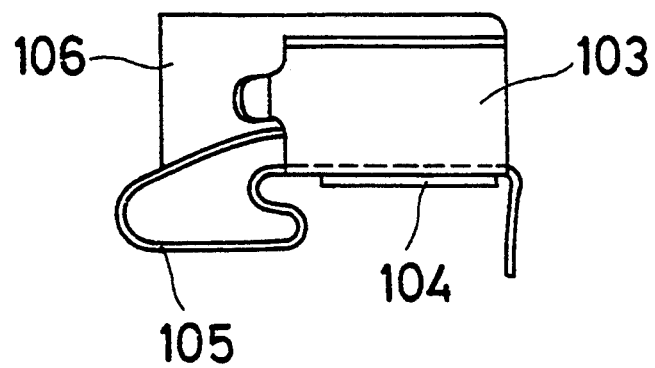
Figure 8B:
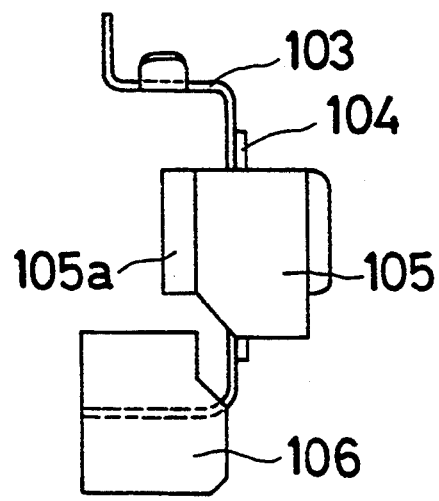
Figure 8C:
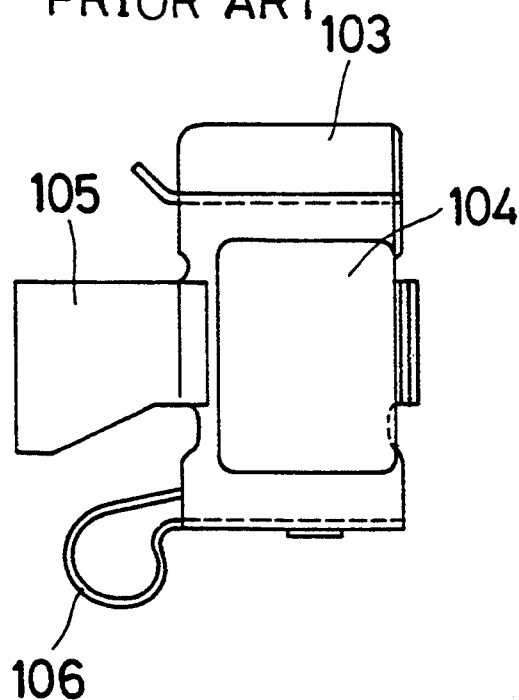

FIGS. 8A, 8B and 8C are orthogonal views which show a pad clip and a shim of a prior disc brake assembly.

DESCRIPTION OF THE PREFERRED EMBODIMENTS

A disc brake assembly constituted in accordance with a preferred embodiment of the present invention will be described with reference to the attached drawings.

Figure 1:
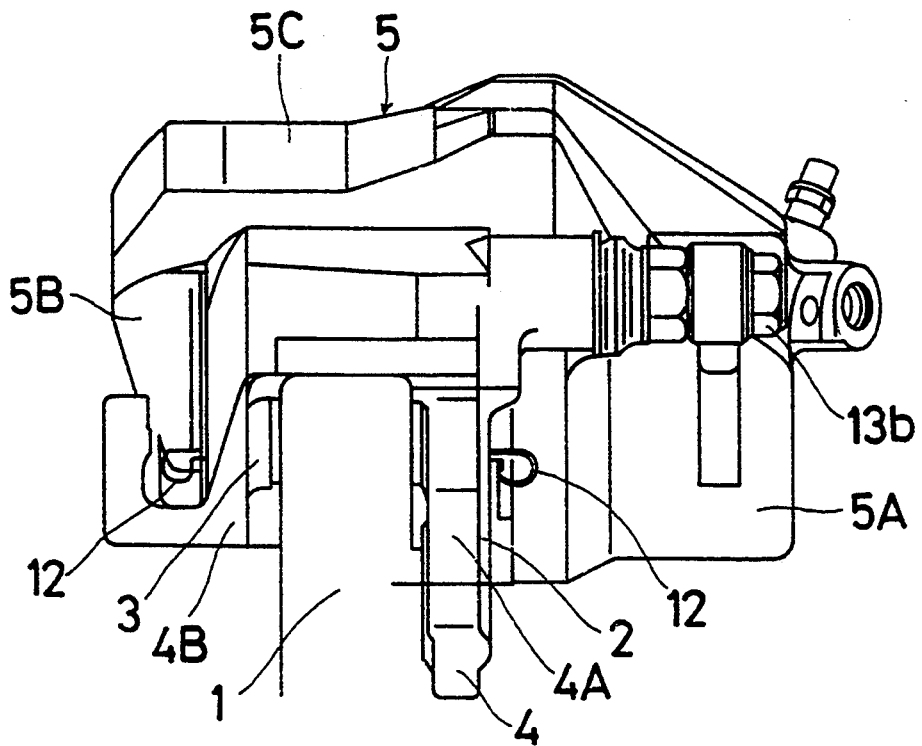
FIG. 1 is a side view of an embodiment of a disc brake assembly in accordance with the present invention.

Referring to FIG. 1 to FIG .2, there is schematically illustrated a disc brake assembly 10 which includes a disc rotor 1, a pair of brake pads (an inner brake pad 2, an outer brake pad 3), a mounting member 4, a caliper member 5, first pad clips 7 and second pad clips 11. The inner brake pad 2 and the outer brake pad 3 are disposed to both sides of the disc rotor 1 which is rotated with wheel in a body, respectively.

The inner brake pad 2 is provided with a pair of ear portions 2a, 2b which are outwardly projected at center portions of both ends in the rotational direction of the disc rotor 1 of its backing plate, respectively. The respective ear portions 2a, 2b are fitted into a pair of groove portions 4a1, 4a2 which are formed on an arm portion 4A of the mounting member 4, respectively, whereby the inner brake pad 2 is slidably supported on the arm portion 4A of the mounting member 4 toward to the axial direction of the disc rotor 1. The mounting member 4 is provided with two arm portions 4A, 4B which are disposed to both side of the disc rotor 1, respectively and is fixed to a part of a vehicle body at an inner side of the disc rotor 1.

On the other hand, the outer brake pad 3 is provided with a pair of ear portions (not shown) which are outwardly projected at center portions of both ends in the rotational direction of the disc rotor 1 of its backing plate, respectively. The respective ear portions (not shown) are fitted into a pair of groove portions (not shown) which are formed on the arm portion 4B of the mounting member 4, respectively, whereby the outer brake pad 3 is slidably supported on the arm portion 4B of the mounting member 4 toward to the axial direction of the disc rotor 1.

The caliper member 5 is straddling a portion of the disc rotor 1 and is provided with a reaction portion 5B pressing the outer brake pad 3 toward an outer side surface of the disc rotor 1, a cylinder portion 5A receiving a piston (not shorn) which presses the inner brake pad 2 toward an inner side surface of the disc rotor 1 and a bridge portion 5C connecting the reaction portion 5B and the cylinder portion 5A. Further, the caliper member 5 is provided with a pair of pin bolts 13a, 13b. Each of the pin bolts 13a, 13b is slidably supported on a pair of guiding holes (not shorn) which are formed in the arm portions 4A, 4B of the mounting member 4 in an axial direction, respectively. Now, the sliding portions between the each of the pin bolt 13a, 13b and the each of the guiding hole is liquid-tightly sealed and is protected from the muddy water and so on, respectively, and the sliding portion between a cylinder hole (not shown) of the cylinder portion 5A and the piston is liquid-tightly sealed by a seal ring (not shown) and is protected from the muddy water and so on by a boot.

In this embodiment, the first pad clips 7 are engaged with one side portions of the arm portions 4A, 4B of the mounting member 4 which are positioned at the entry side in the rotational direction of the disc rotor 1 due to the forward movement of the vehicle so as to cover inner faces of the groove portions 4a1 along the inner faces of the groove portions 4a1 and so as to be positioned between the ear portions 2a of the both brake pads 2, 3 and the groove portions 4a1, respectively. Each of the first pad clips 7 is made of a metallic plate having corrosion resistance and elasticity and is provided with a holding portion 6, a side spring portion 8 and a damper portion 9 as shown in FIG .2 to FIG. 6.

The holding portion 6 is formed on the first clip 7 In a body and is provided with an elastic portion 6a which is connected with the lower wall portion of the first pad clip 7 through a curl portion and which extends toward the disc rotor 1 in the axial direction of the disc rotor 1 in the groove portion 4a1. The curl portion of the holding portion 6 extends so as to separate from the disc rotor 1 and is curled so as to extend toward the disc rotor 1. The initial condition of the elastic portion 6a of the holding portion 6 is shown in FIG.3 and FIG.4 by two dotted chain line and thereby the elastic portion 6a of the holding portion 6 is elastically deformed by the ear portion 2a so as to normally urge the inner brake pad 2 outwardly in the diametrical direction of the disc rotor 1.

The side spring portion 8 is formed on the first clip 7 in a body and is provided with an elastic portion 8a which is connected with the vertical wall portion of the first pad clip 7 through a curl portion and which extends toward the disc rotor 1 In the axial direction of the disc rotor 1 in the groove portion 4a1. The curl portion of the side spring portion 8 extends so as to separate from the disc rotor 1 and is curled so as to extend toward the disc rotor 1. The curl portion of the side spring portion 8 elastically nips the arm portion 4A with a nail portion 7a which is formed on the first pad clip 7. The initial condition of the elastic portion 8a of the side spring portion 8 is shown in FIG. 5 by two dotted chain line and thereby the elastic portion 8a of the side spring portion 8 is elastically deformed by the ear portion 2a so as to normally urge the inner brake pad 2 toward the tangential direction in the rotational direction of a disc rotor 1.

The damper portion 9 is formed on the first clip 7 in a body and is provided with an arm portion 9b which is connected with the vertical wall portion of the first pad clip 7 through a curl portion 9a and which extends toward the disc rotor 1 in the groove portion 4a1. In this embodiment, the damper portion 9 is formed on the vertical wall portion of the first pad clip 7 which is positioned under the side spring portion 8. However, it is able to form the damper portion 9 on the vertical wall portion of the first pad clip 7 which Is positioned over the side spring portion 8. As shorn In FIG. 6, the curl portion 9a of the damper portion 9 extends so as to separate from the disc rotor 1 and is curled so as to extend toward the disc rotor 1. The arm portion 9b is extended in the axial direction of the disc rotor 1 so as to maintain a clearance between the arm portion 9b and the vertical wall portion of the first pad clip 7 and is inclined toward the vertical wall portion of the first pad clip 7 so as to contact its top end with the vertical wall portion of the first pad clip 7 which is adjacent to the inner side surface of the disc rotor 1. Thereby, a center spring (a bending spring which its both ends are supported) is formed between the top end of the arm portion 9b and the curl portion 9a and therefore the damping effect is improved. Now, the first pad clip which is engaged with one side portion of the arm portion 4B of the mounting member 4 positioned at the entry side in the rotational direction of tile disc rotor 1 due to the forward of the vehicle has the same structures as the above mentioned first pad clip 7 engaged with the arm portion 4A of the mounting member 4.

Figure 2:
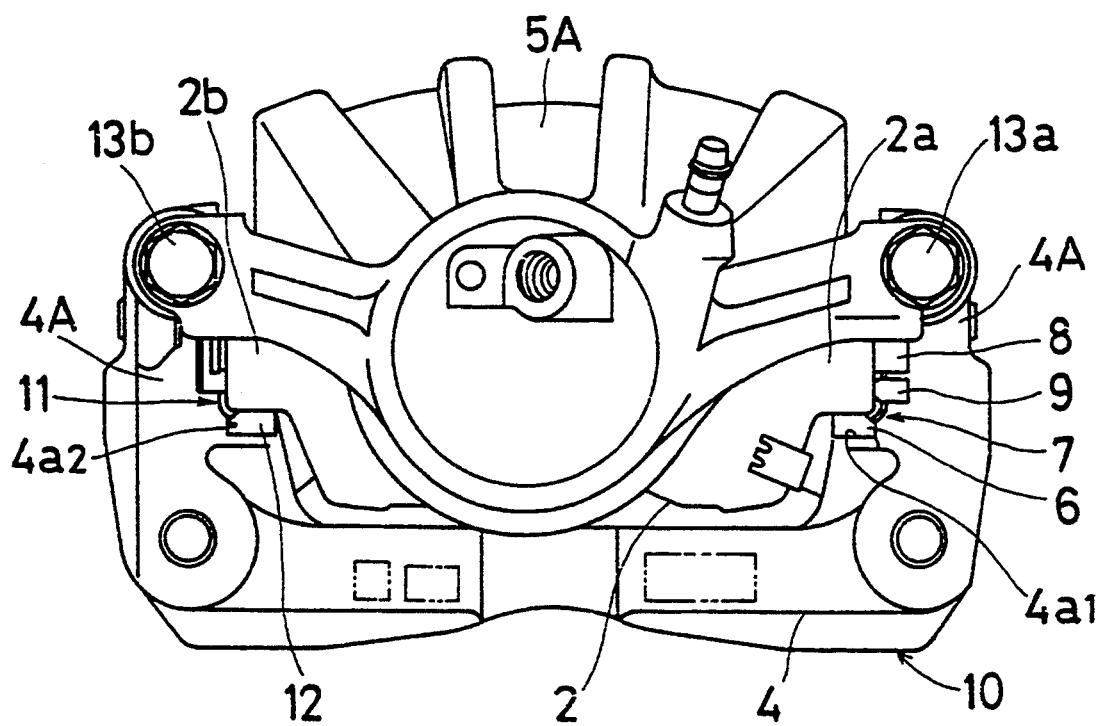
FIG. 2 is a rear elevational view of an embodiment of a disc brake assembly in accordance with the present invention.

The second pad clips 11 are engaged with the other side portions of the arm portions 4A, 4B of the mounting member 4 which are positioned at the exit side in the rotational direction of the disc rotor 1 due to the forward movement of the vehicle so as to cover inner faces of the groove portions 4a2 along the inner faces of the groove portions 4a2 and so as to be positioned between the ear portions 2b of the both brake pads 2, 3 and the groove portions 4a2, respectively. Each of the second pad clips 11 is made of a metallic plate having corrosion resistance and elasticity and is provided with a holding portion 12 as shown in FIG. 1 and FIG.2.

The holding portion 12 is formed on the first clip 11 in a body and is provided with an elastic portion which is connected with the lower wall portion of the second pad clip 11 through a curl portion and which extends toward the disc rotor 1 in the axial direction of the disc rotor 1 in the groove portion 4a2. The curl portion of the holding portion 12 extends so as to separate from the disc rotor 1 and is curled so as to extend toward the disc rotor 1. Under the condition which the ear portion 2b of the inner brake pad 2 is supported on the groove portion 4a2 through the second pad clip 11, the elastic portion of the holding portion 12 is elastically deformed by the ear portion 2b so as to normally urge the inner brake pad 2 outwardly in the diametrical direction of the disc rotor 1. Now, the second pad clip which is engaged with the other side portion of the arm portion 4B of the mounting member 4 positioned at the exit side in the rotational direction or the disc rotor 1 due to the forward of the vehicle has the same structures as the above mentioned second pad clip 11 engaged with the arm portion 4A of the mounting member 4.

As mentioned above, the both brake pads 2, 3 are always urged by the holding portions 6, 12 of the first and second pad clips 7, 11 so as to contact the upper surfaces of the ear portions 2a, 2b with the upper inner surfaces of the groove portions 4a1, 4a2 of the arm portions 4A, 4B of the mounting member 4 through the first and second clips 7, 11. Therefore, both brake pads 2, 3 are slidably supported on the mounting member 4 without play in the diametrical direction of the disc rotor 1. Furthermore, the both brake pads 2, 3 are always urged by the side spring portions 8a through the ear portions 2a so as to contact the ear portions 2b with the vertical wall portions of the second pad clips 11 engaged with the groove portions 2b of the arm portions 4A, 4B which are positioned at the exit side in the rotational direction of the disc rotor 1 due to the forward movement of the vehicle.

The above-described embodiment of the disc brake assembly operates as follows. Referring to FIG. 1 and FIG. 2, when the hydraulic pressure is applied to the cylinder hole (not shown) of the cylinder portion 5A of the caliper member 5 in the forward of the vehicle, the piston (not shown) presses the inner brake pad 2 toward the inner side surface of the disc rotor 1 and the reaction portion 5B presses the outer brake pad 3 toward the outer side surface of the disc rotor 1 by a reaction force of the hydraulic pressure pressing the inner brake pad 2 through the piston (not shown). Thereby, both brake pads 2, 3 are frictional engaged with the disc rotor 1 and the wheel which is rotated with the disc rotor 1 in a body is braked.

In this condition, the frictional forces between the disc rotor 1 and the both brake pad 2, 3 act on the both brake pad 2, 3 so as to move the both brake pad 2, 3 toward the tangential direction in the rotational direction of the disc rotor 1. In this embodiment, however, since the ear portions 2b of the brake pads 2, 3 are always contacted with the vertical wall portions of the second pad clips 11 engaged with the groove portions 2b of the arm portions 4A, 4B, the both brake pads 2, 3 do not move toward the tangential direction in the rotational direction of the disc rotor 1. Thereby, It is prevented that the uncomfortable noise is generated by a collision between the brake pads 2, 3 and the other side portions of the arm portions 4A, 4B which are positioned at the exit side in the rotational direction of the disc rotor 1 due to the forward movement of the vehicle.

On the other hand, in case of the operation of the disc brake assembly 10 in the backward movement of the vehicle, the brake pads 2, 3 move toward the tangential direction in the rotational direction of the disc rotor due to the backward movement of the vehicle by the frictional forces between the brake pads 2, 3 and the disc rotor 1 and thereby the elastic portions 8a of the side spring portions 8 of the first pad clips 7 are elastically deformed. And then, when the brake pads 2, 3 contact with the arm portions 9b of the damper portions 9, the arm portions 9b function as a cushion or a damper and therefore the shock is absorbed. Thereby, It is prevented by the damper portion 9 that the uncomfortable noise is generated by a collision between the brake pads 2, 3 and the one side portions of the arm portions 4A, 4B which are positioned at the entry side in the rotational direction of the disc rotor 1 due to the backward movement of the vehicle.

In the above mentioned embodiment, the present invention is realized for the disc brake assembly of a type in which the mounting member is provided with a pair of arm portions having a pair of groove portions and in which a pair of brake pads are provided with a pair of ear portions slidably supported on the groove portions, respectively. However, it is possible to realize the present invention to the disc brake assembly of the type which the mounting member is provided with an arm portion having a pair of groove portions in which the inner brake pad is provided with a pair of ear portions slidably supported on the groove portions in which the outer brake pad is supported on the reaction portion of the caliper member.

As mentioned above, according to the present invention, it is prevented by the damper portion formed on the first pad clip in a body that the uncomfortable noise is generated by a collision between the arm portion of the mounting member and the brake pad under the condition of the operation of the disc brake assembly in the backward of the vehicle. Therefore, it is able to prevent the generation of the uncomfortable noise without increasing of the manufacturing cost and the assembling steps of the disc brake assembly.

The principles, a preferred embodiment and modes of operation of the present invention have been described in the foregoing description. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is

1. A disc brake assembly comprising;
   a disc rotor rotated together with a wheel,
   a mounting member fixed to a stationary member of a vehicle and having at least one arm portion in which a pair of grooves extending toward the axial direction of the disc rotor are provided therein,
   a pair of brake pads disposed to both sides of the disc rotor and each having a pair of ear portions which are outwardly projected at the outer sides of both ends of at least one of the brake pads in the rotational direction of the disc rotor and which are fitted into the grooves of the arm portion of the mounting member so as to be able to slide in a parallel direction with respect to a rotational shaft of the disc rotor,
   a caliper member slidably supported on the mounting member so as to be movable in an axial direction of the disc rotor and pressing each of the brake pads against faces of the disc rotor, respectively, and
   at least one first pad clip engaged with a one side portion of the at least one arm portion of the mounting member which is positioned at the entry side in the rotational direction of the disc rotor due to the forward movement of the vehicle so as to cover one of the grooves and having a holding portion which is unitarily formed on the first pad clip and which normally urges the one brake pad in substantially the diametrical direction of the disc rotor through one of the ear portions formed on one end of the at least one brake pad, a side spring portion which is unitarily formed on the first pad clip and which normally urges the one brake pad toward the tangential direction in the rotational direction of the disc rotor through the one ear portion so as to normally contact the other end of the one brake pad with the other side portion of the arm portion of the mounting member positioned at the exit side in the rotational direction of the disc rotor due to the forward movement of the vehicle and a damper portion which is unitarily formed on the first pad clip and which is provided with an arm portion extending between the first pad clip and a one end of the one ear portion of the one brake pad in the rotational direction of the disc rotor toward the axial direction of the disc rotor and contacted with the first pad clip at a top end thereof.

2. A disc brake assembly as recited in claim 1, wherein the arm portion of the damper portion is extended toward the disc rotor so as to maintain a clearance between the arm portion of the damper portion and the first pad clip until a top end thereof is contacted with a part of the first pad clip which is adjacent to the disc rotor.

3. A disc brake assembly as recited in claim 2 further comprising at least one second pad clip engaged with the other side portion of the arm portion of the mounting member which is positioned at the exit side in the rotational direction of the disc rotor due to the forward movement of the vehicle so as to cover the other groove and having a holding portion which is unitarily formed on the second pad clip and which normally urges the one brake pad in substantially the diametrical direction of the disc rotor through the other ear portion formed on the other end of the one brake pad.

4. A disc brake assembly as recited in claim 3, wherein the arm portion of the damper portion contacts the one end of the one ear portion of the one brake pad in the rotational direction of the disc rotor when the one brake pad is moved against the urging force of the side spring portion by a frictional force toward the tangential direction in the rotational direction of the disc rotor due to the backward movement of the vehicle.

5. A disc brake assembly as recited in claim 2, wherein the arm portion of the damper portion is connected with the first pad clip through a curl portion.

* * * * *